United States Patent [19]

Lange

[11] 4,179,486

[45] Dec. 18, 1979

[54] METHOD OF PROTECTING $Si_3N_4$ CERAMIC ALLOY DURING HEATING

[75] Inventor: Frederick F. Lange, Thousand Oaks, Calif.

[73] Assignee: Rockwell International Corporation, El Segundo, Calif.

[21] Appl. No.: 926,770

[22] Filed: Jul. 21, 1978

[51] Int. Cl.$^2$ .................... C04B 35/58; C04B 35/50
[52] U.S. Cl. .................... 264/65; 106/73.2; 106/73.5
[58] Field of Search .............. 106/73.2, 73.5; 264/65

[56] References Cited

U.S. PATENT DOCUMENTS

| | | | |
|---|---|---|---|
| 3,969,125 | 7/1976 | Komeya et al. | 106/73.2 |
| 3,983,198 | 9/1976 | Mangels | 264/65 |
| 4,101,616 | 7/1978 | Buljan | 106/73.5 |
| 4,112,143 | 9/1978 | Adlerborn et al. | 264/65 |
| 4,143,107 | 3/1979 | Ishii et al. | 264/65 |

FOREIGN PATENT DOCUMENTS 2221421 10/1974 France .................... 106/73.5

OTHER PUBLICATIONS

Crandall, W. B. et al., "Preparation and Evaluation of Si–Al–O–N", –IIT Research Inst. (1974)–Aerospace Research Labs (ARW 74-0099), pp. 16-18, pp. 43-44.

*Primary Examiner*—Helen M. McCarthy
*Attorney, Agent, or Firm*—L. Lee Humphries; Craig O. Malin

[57] ABSTRACT

Articles made from $Si_3N_4$ ceramic alloy powders are protected during heating by loosely packing them in $Si_3N_4$ before heating. Compacts made from $Si_3N_4$ ceramic alloys are protected from both oxidation and from volatilization by the encompassing powder even though the furnace atmosphere is air.

9 Claims, No Drawings

METHOD OF PROTECTING $Si_3N_4$ CERAMIC ALLOY DURING HEATING

BACKGROUND OF THE INVENTION

1. Field of the Invention

This invention relates to the field of sintering powder parts and particularly to the sintering of pre-shaped compacts made from $Si_3N_4$ ceramic alloy compacts.

2. Description of the Prior Art

Pressed and sintered parts made from $Si_3N_4$ powders with or without additives such as metal oxides are useful for some high temperature structural applications. The pressed powder compacts must be protected from passive oxidation during the high temperature (approximately 1700° C.) sintering process. At the sintering temperature, $Si_3N_4$ oxidizes to $SiO_2$ if the partial pressure of oxygen in the furnace atmosphere is greater than about 0.1 atmosphere, according to the following:

$$Si_3N_4(s) + 3O_2(g) \rightarrow 3SiO_2(s,l) + 2N_2(g)$$

Such passive oxidation is undesirable and increases the weight of the sintered compact.

To protect the compacts from such passive oxidation, non-oxidizing furnace atmospheres are used.

Typically, a nitrogen atmosphere is used with an oxygen partial pressure as low as possible. In some instances, compacts are packed in their own powder and sintered in a nitrogen atmosphere, however a nitrogen atmosphere is still considered essential. The use of a nitrogen atmosphere or other controlled atmosphere furnace adds unwanted complications, and makes the sintering of $Si_3N_4$ components a batch operation.

A particularly useful $Si_3N_4$ ceramic alloy is $Si_3N_4$-$CeO_2$. Prior art attempts to densify this alloy by sintering in nitrogen at one atmosphere pressure were unsuccessful due to a volatilization phenomenon. It has been reported (H. F. Priest, G. L. Priest, and G. E. Gazza, *J. Am. Ceram. Soc.* 60, 1977) that $Si_3N_4 + 20$ weight % $CeO_2$ composite powders can be densified by sintering at 1800°–1900° C. in nitrogen at pressures between 250–300 psi. Such high nitrogen pressures are difficult to obtain at the sintering temperature and virtually exclude such prior art method from commercial application.

Hot pressing has been used to densify $Si_3N_4 + 20$ weight % $CeO_2$ and the resulting samples had an average flexural strength of 100,000 psi at room temperature and 80,000 psi at 1400° C. Unfortunately, complex-shaped articles cannot be manufactured by hot pressing.

SUMMARY OF THE INVENTION

It is an object of the invention to provide an improved method for sintering $Si_3N_4$ ceramic alloy compacts.

It is an object of the invention to provide an economical method for protecting $Si_3N_4$ ceramic alloy articles during sintering.

It is an object of the invention to provide a method for densifying $Si_3N_4$-$CeO_2$ compacts by sintering at atmospheric pressure.

According to the invention, articles made from $Si_3N_4$ ceramic alloy powders are protected during heating by loosely packing them in $Si_3N_4$ before heating. Compacts made from $Si_3N_4$ ceramic alloys are protected from both oxidation and from volatilization by the encompassing powder even though the furnace atmosphere is air.

These and other objects and features of the present invention will be apparent from the following detailed description.

DESCRIPTION OF THE PREFERRED EMBODIMENT

The fabrication of parts from powder is an established art which involves forming a powder of suitable size and composition into the desired shape to form a compact. The compact is then sintered at a high temperature to bond the particles of powder together. Particle size, composition, and sintering temperature are established based upon known requirements. The terms $Si_3N_4$ powder or $Si_3N_4$ ceramic alloy, as used in describing this invention, apply to powders or articles formed from powders which have $Si_3N_4$ as a major ingredient. The powder will normally include substantial amounts of other ingredients such as metal oxide densification aids.

Compacts of $Si_3N_4$ powder with a densification aid can be densified by pressureless sintering. However, volatilization is a phenomenon which competes with densification during sintering and without proper precautions, a loss instead of a gain in density may occur during sintering.

According to a prior teaching, volatilization was caused by the dissocation or decomposition of $Si_3N_4$. For this reason, compacts made from $Si_3N_4$-$CeO_2$ powders were sintered in atmospheres of high pressure nitrogen to shift the equilibrium away from dissociation of the compounds. However, a study of thermodynamic data show that $Si_3N_4$ should not dissociate under one atmosphere of nitrogen below a temperature of about 1880° C. Since weight losses are observed under one atmosphere of nitrogen at temperatures as low as 1500° C., some phenomenon other than decomposition of $Si_3N_4$ must cause the volatilization.

In work leading to the present invention, it was discovered that the weight loss was caused by active oxidation (rather than decomposition) according to the following equation:

$$Si_3N_4(s) + 1.5O_2(g) \rightarrow 3SiO(g) + 2N_2(g)$$

A series of experiments were performed to show that active oxidation is a likely cause of volatilization. Compacted discs of $Si_3N_4$ powder were placed in a graphite furnace and heated to 1700° C. for one hour. The first set of experiments was conducted by placing the discs on a graphite pedestal, separated with a layer of $Si_3N_4$ powder, and exposing them to flowing nitrogen. The same procedure was used for the second set of experiments, except the furnace was sealed before heating. In the third set, the discs were embedded within a loosely packed $Si_3N_4$ powder contained within either an open graphite or fused silica container and heated in a static nitrogen atmosphere. The purpose of the surrounding $Si_3N_4$ powder was to getter oxygen perculating through to the disc specimens. As shown by the results in Table I, weight loss diminished as the specimens were isolated from the oxygen available within the furnace atmosphere.

| Condition | Average Weight Loss (%) 1700° C./1 hr |
|---|---|
| Flowing nitrogen | 23 |

| Condition | Average Weight Loss (%) 1700° C./1 hr |
|---|---|
| Static nitrogen | 12 |
| Embedded in $Si_3N_4$ powder | 1.5 |

There are many sources of oxygen available for active oxidation during sintering depending upon the type furnace used. A furnace atmosphere of flowing nitrogen furnishes a continuous supply of oxygen as an impurity in the nitrogen. In closed systems, the partial pressure of oxygen, the furnace to specimen volume ratio, and the surface area of the compacted powder part determine, at least in part, the oxygen available.

The present invention reduces volatilization of $Si_3N_4$ ceramic alloy powder compacts during sintering (or other high temperature heating) by reducing the oxygen available to the compact. This is achieved simply by loosely embedding the compact in $Si_3N_4$ powder. The particle size of the powder is not critical but it should be sufficiently fine to closely cover the compact and minimize the void dimension between particles. The powder need not be 100% $Si_3N_4$. Conveniently, the packing powder may have the same composition as the part being heated.

Examples I-III below illustrate the fact that the method of the invention protects $Si_3N_4$ compacts from oxidation, even though the compacts (which lacked densification aids) were not sintered at the temperature used. Examples IV-VI also illustrate the oxidation protection provided by the present invention, but in these examples the discs were sintered.

EXAMPLE I

Silicon nitride powder having a size of less than 325 mesh was placed in an open, fused silica container. A compact in the form of a prepressed disc of $Si_3N_4$ powder (without a densification aid) was placed in the container and the $Si_3N_4$ powder loosely packed around it. The loaded container was placed in a refractory lined, electrically heated oxidizing (air) furnace and held at 1650° C. for 1 hour.

During heating, it was observed that the outer surface of the loosely packed $Si_3N_4$ powder rapidly oxidized and sealed both the inner powder and the compact from the oxidizing environment.

The container was furnace cooled and then removed from the furnace. The thin outer oxidized shell was easily broken to reveal the compact in the loosely packed powder. The compact was easily removed from the protective powder.

There was no change in the weight or the density of the compact, illustrating complete protection of the part from oxidation.

EXAMPLE II

Example II is the same as Example I except that the time at 1650° C. was increased to 3 hours. Weight measurements and X-ray diffraction analysis showed no difference caused by the longer heating time.

EXAMPLE III

Example III is the same as Example 1 except that a fibrous $Al_2O_3$ refractory material container was used rather than the fused silicon container. There was no change in the compact.

EXAMPLES IV and V

Examples IV and V are the same as Examples I and III except that the compacts were formed from a composite powder having a composition of 75% $Si_3N_4$, 20% $Al_2O_3$, and 5% MgO (weight %). The resulting discs were sintered and had a density of 96% of theoretical density.

EXAMPLE VI

A powder is made by mixing 80% $Si_3N_4$ and 20% $CeO_2$ (weight %) and grinding them together in a ball mill to an approximate average particle size of less than 4 microns. A compact is formed by pressing the powder into a disc. This compact is then placed in a fused silica container and some of the same powder used to make the compact is loosely packed around the compact.

The loaded container is then placed in a refractory lined, electrically heated furnace having an oxidizing atmosphere and then sintered by heating for one hour at 1750° C.

After sintering, the loaded container is furnace cooled and then removed from the furnace. The silicon oxide crust is broken and the compact removed from the powder.

After sintering, density of the disk is 3.39 gm/cm³ (96% of theoretical density). X-ray analysis shows that the sintered material is primary $\beta$-$Si_3N_4$ with a secondary phase of cerium apatite, $Ce_{4.67}(SiO_4)_3O$.

Numerous variations and modifications may be made without departing from the present invention. For example, $Si_3N_4$ compacts having a wide variety of densification aids and other additives can be protected during heating according to the method of the invention. Accordingly, it should be clearly understood that the form of the present invention described above is illustrative only and is not intended to limit the scope of the present invention.

What is claimed is:

1. A method of protecting a $Si_3N_4$ ceramic alloy article during heating comprising the steps of:
   providing a $Si_3N_4$ ceramic alloy article;
   loosely packing said article in $Si_3N_4$ powder;
   heating said article and said powder to a processing temperature in an oxidizing atmosphere;
   cooling said article and said powder to a temperature below said processing temperature; and
   removing said article from said powder.

2. The method as claimed in claim 1, wherein said step of heating comprises placing said article in a furnace at atmospheric pressure having an air atmosphere.

3. The method as claimed in claim 2, wherein said step of cooling comprises furnace cooling said article and said powder.

4. The method as claimed in claim 1, wherein said $Si_3N_4$ powder has a composition substantially the same as the composition of said $Si_3N_4$ ceramic alloy article.

5. The method as claimed in claim 1, wherein said $Si_3N_4$ powder is placed in an $Al_2O_3$ container.

6. The method as claimed in claim 1, wherein said $Si_3N_4$ powder is placed in an $SiO_2$ container.

7. A method of protecting a $Si_3N_4$-$CeO_2$ ceramic alloy article during heating comprising the steps of:
   providing a $Si_3N_4$-CeO ceramic alloy article;
   loosely packing said article in $Si_3N_4$ powder;
   heating said article and said powder to a processing temperature in an oxidizing atmosphere;

cooling said article and said powder to a temperature below said processing temperature; and removing said article from said powder.

8. The method as claimed in claim 7, wherein said step of heating comprises placing said article in a furnace at atmospheric pressure having an air atmosphere, and wherein said step of cooling comprises furnace cooling said article and said powder.

9. The method as claimed in claim 7, wherein said $Si_3N_4$ powder comprises a $Si_3N_4$-$CeO_2$ ceramic alloy powder.

* * * * *